INVENTOR.
JOHN T. BICKMORE
JOSEPH J. CODICHINI
CHARLES L. HUBER
BY
ATTORNEY

INVENTOR.
JOHN T. BICKMORE
JOSEPH J. CODICHINI
CHARLES L. HUBER
BY

ATTORNEY

INVENTOR.
JOHN T. BICKMORE
JOSEPH J. CODICHINI
CHARLES L. HUBER
BY
ATTORNEY

Oct. 1, 1963

J. T. BICKMORE ETAL 3,105,426

XEROGRAPHIC APPARATUS

Filed April 4, 1960

INVENTOR.
JOHN T. BICKMORE
JOSEPH J. CODICHINI
BY CHARLES L. HUBER

ATTORNEY

Oct. 1, 1963 J. T. BICKMORE ETAL 3,105,426
XEROGRAPHIC APPARATUS
Filed April 4, 1960 10 Sheets-Sheet 6

INVENTOR.
JOHN T. BICKMORE
BY JOSEPH J. CODICHINI
CHARLES L. HUBER

ATTORNEY

Oct. 1, 1963

J. T. BICKMORE ETAL 3,105,426

XEROGRAPHIC APPARATUS

Filed April 4, 1960

*INVENTOR.*
JOHN T. BICKMORE
JOSEPH J. CODICHINI
CHARLES L. HUBER

BY

*ATTORNEY*

INVENTOR.
JOHN T. BICKMORE
JOSEPH J. CODICHINI
CHARLES L. HUBER
ATTORNEY

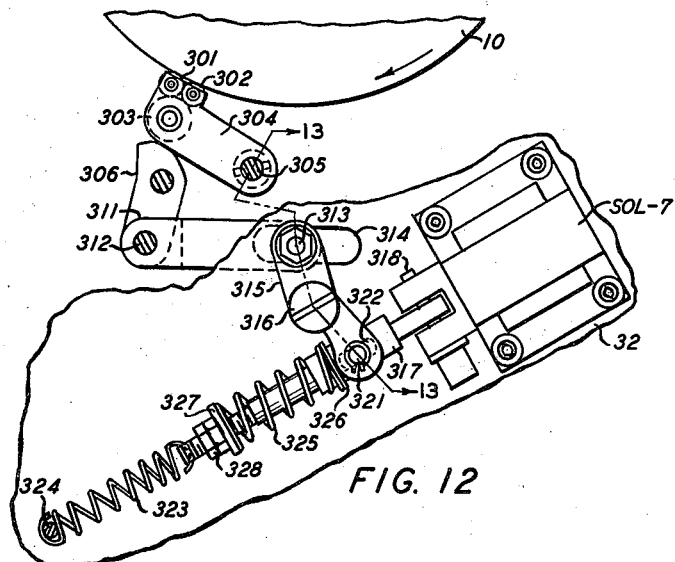
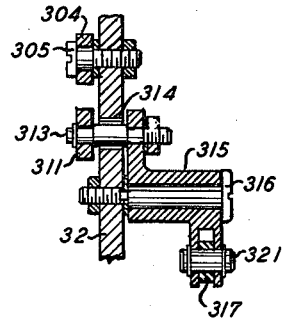
FIG. 13
FIG. 12
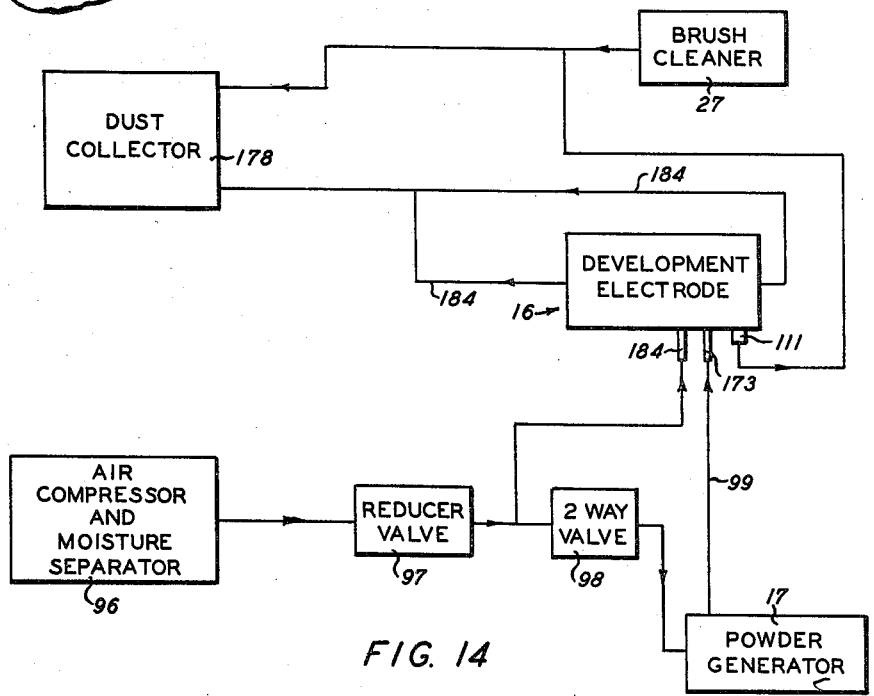
FIG. 14
INVENTOR.
JOHN T. BICKMORE
JOSEPH J. CODICHINI
BY CHARLES L. HUBER
ATTORNEY

INVENTOR.
JOHN T. BICKMORE
JOSEPH J. CODICHINI
CHARLES L. HUBER
BY
ATTORNEY

United States Patent Office 3,105,426
Patented Oct. 1, 1963

3,105,426
XEROGRAPHIC APPARATUS
John T. Bickmore, Rochester, Joseph J. Codichini, Fairport, and Charles L. Huber, Byron, N.Y., assignors to Xerox Corporation, a corporation of New York
Filed Apr. 4, 1960, Ser. No. 19,951
2 Claims. (Cl. 95—1.7)

This invention relates to xerography and, in particular, to an improved apparatus for producing xerographic reproductions at variable speeds.

In the process of xerography, for example, as disclosed by either Carlson Patent 2,297,691, issued October 6, 1942, or in Carlson Patent 2,357,809, issued September 12, 1944, a xerographic plate comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developers which are held on the plate coating electrostatically in a pattern corresponding to the electrostatic latent image. Thereafter, the developed xerographic image is usually transferred to a support material to which it may be fixed by any suitable means.

In the art of xerography, as principally exemplified in the above-referenced Carlson patents, it has been possible to make high quality xerographic reproductions of both line copy and continuous tone images using a continuous xerographic process. However meritorious these prior art devices may be, the utility of any single device has been limited. For example, these prior art devices all operate at a constant speed and thus are not suitable for use in an application in which the rate of image information may change. One such application, for example, may be the use of a reproducing apparatus in an aircraft for recording images of the terrain over which the aircraft is flying at varying altitudes and speed. It is apparent that if a xerographic apparatus operating at a constant speed is used in an aircraft to make strip continuous tone image aerial maps of the terrain, the resulting images would be blurred as a result of the variations in speed and altitude of the aircraft. To obtain high quality continuous tone images of the terrain the lineal speed of the drum surface must be coordinated with the ground speed of the aircraft over the terrain.

Although in the common mechanical arts modification of a constant speed machine into a variable speed machine may be considered as within the realm of a skilled mechanic, this is not the case in the field of xerography. For example, in a xerographic machine having a rotating xerographic plate, varying the rotative speed of the plate, while necessary, is not the only element which must be controlled to transform a constant speed xerographic machine into a variable speed xerographic machine.

It is therefore an object of this invention to provide a new and improved xerographic apparatus for making continuous reproductions at varying speeds, as desired.

Another object of this invention is to provide a new and improved xerographic apparatus operable at varying speeds which can be controlled automatically or manually to varying the speed of the machine in relation to the speed of incoming images to be reproduced.

These and other objects of the invention are attained by means of a charging device, a stationary-copy projection device, a developer mechanism, a sheet-feeding mechanism, a transfer charging device, a sheet pick-off device, a paper transport and fuser mechanism, and a brush cleaner, all operatively positioned around a rotatably journaled xerographic drum, each of the above elements being suitably driven and controlled to permit coordinated operation of the apparatus to reproduce a copy from a stationary original selectively and automatically.

For a better understanding of the invention as well as other objects and further features thereof, reference is had to the following detailed description of the invention to be read in connection with the accompanying drawings, wherein:

FIG. 12 is a side view, partly in section, of the transfer mechanism of the apparatus;

FIG. 13 is a sectional view taken along line 13—13 of FIG. 12;

FIG. 14 is a diagrammatic view of the pneumatic system of the apparatus;

Figure 1:
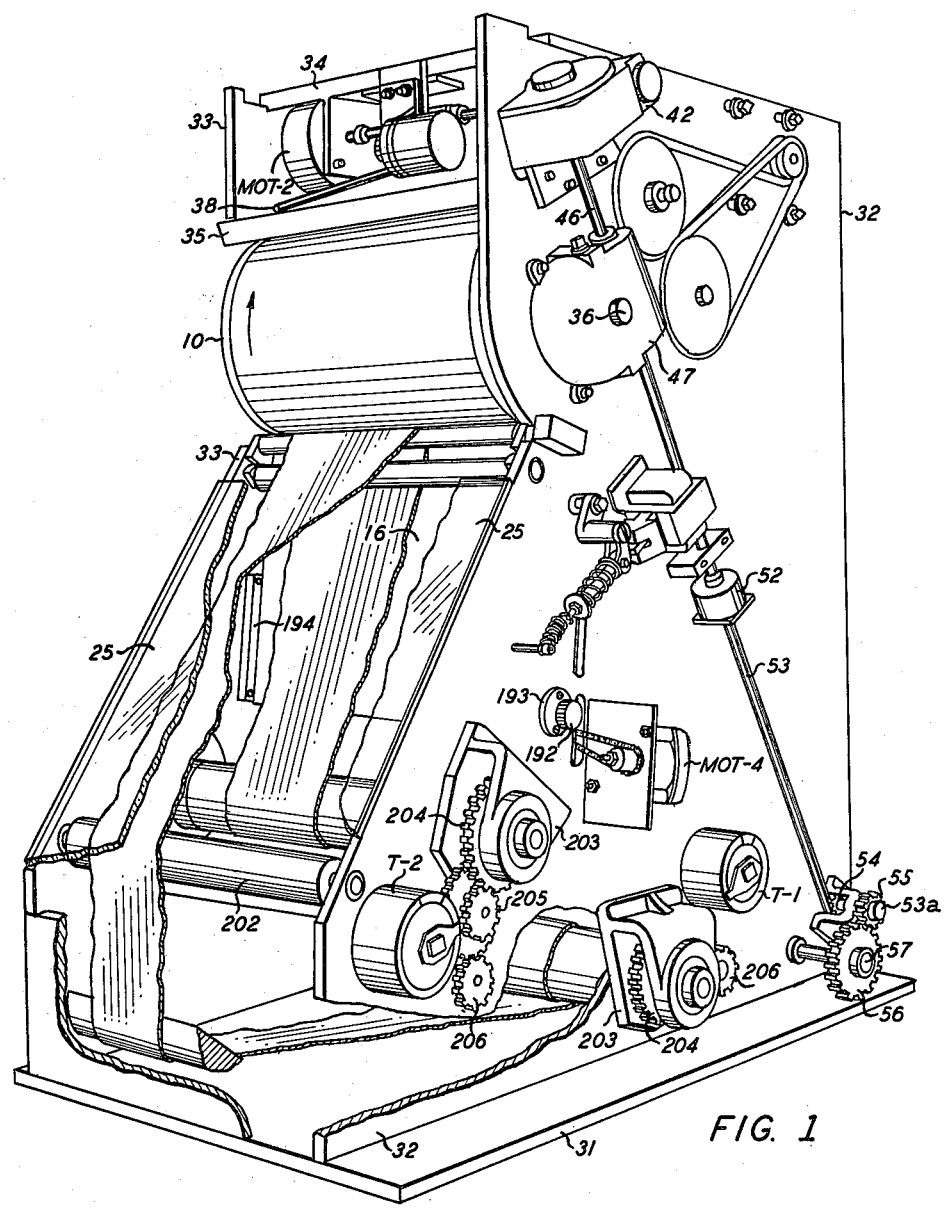
FIG. 1 is a right-hand perspective view, partly broken away to show structural details, of the xerographic apparatus of the invention.
Figure 2:
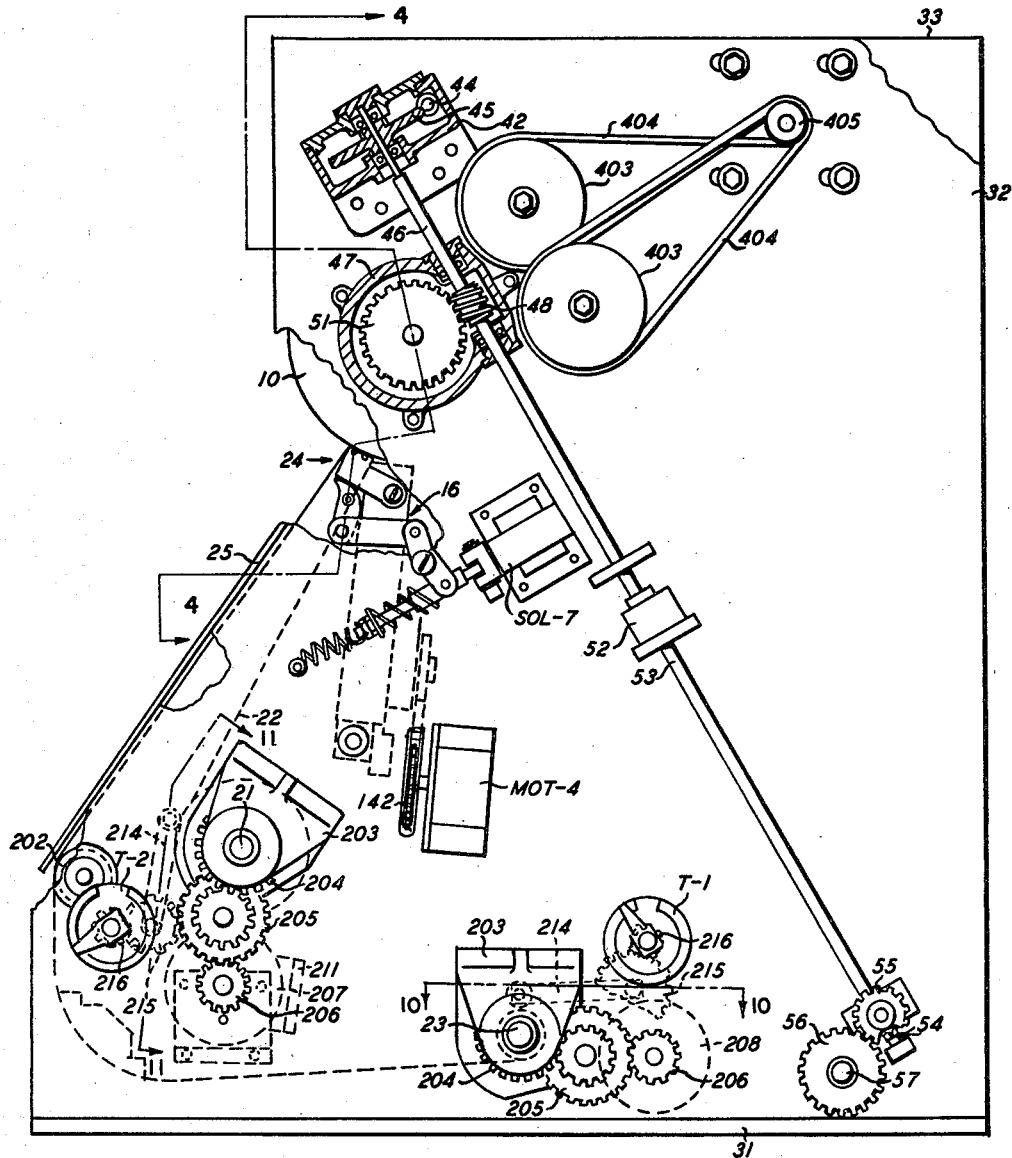
FIG. 2 is a right-hand view of the apparatus of FIG. 1.

Referring now to the drawings there is disclosed a preferred embodiment of a variable speed xerographic processor for producing continuous tone images. Specifically, the apparatus shown is a close-access xerographic recorder for use in an aircraft to produce permanent continuous tone images on a transfer material from suitable infrared or radar images of the objects to be reproduced while at the same time permitting members of the aircraft to view these images within a relatively short period of time.

As shown in FIG. 1, the variable speed xerographic apparatus comprises a xerographic plate including a photoconductive layer or radiation-receiving surface on a conductive backing and formed in the shape of a drum, generally designated 10, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image pass over the drum surface, whereby the toner particles adhere to the electrostatic latent image to form a xerographic powder image in the configuration of the copy to be reproduced;

A transfer station, at which the xerographic powder image is transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus includes a corona discharge device 11 which consists of an array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members to expose the charged xerographic drum to a radiation image, which then causes a release of the charge on the drum in proportion to the radiation from the copy onto the surface of the drum. As shown, the exposure mechanism includes a cathode ray tube 12 connected to a suitable electronic circuit, not shown or described since the specific details of the cathode ray tube and the electronic circuit form no part of the instant invention, it being apparent that other types of exposure mechanisms, such as optical scanning or projecting systems could be used in lieu of the cathode ray tube to project a flowing image onto the photoconductive surface of the drum. Images projected by the cathode ray tube onto the image mirror 13 are reflected onto object mirror 14 for projection onto the xerographic drum, the entire projection system being enclosed in a suitable exposure housing 15 to exclude extraneous light.

Adjacent to the exposure station is a developing station C in which there is positioned a development electrode 16 which is mounted to maintain a uniform close spacing between its upper surface and the surface of the xerographic plate to form a development zone therebetween. The development electrode 16 is supplied with a powder cloud by powder cloud generator 17.

Positioned next and adjacent to the developing station is the image transfer station D which includes a web feeding mechanism to feed a web of paper or other suitable transfer material to the drum and a transfer mechanism to effect transfer of a developed xerographic powder image from the drum onto the transfer material. The web feeding mechanism includes a supply roll 21 for a web of transfer material 22 which is fed up and over transfer mechanism 24 into transfer contact with the drum and then down under a viewing plate or glass plate 25 across a fusing apparatus, such as heat fuser 26, whereby the developed and transferred xerographic powder image on the transfer material is permanently fixed thereto from whence it is wound onto take-up roll 23.

The next and final station in the device is a drum cleaning station E, having positioned therein a plate cleaner 27 adapted to remove any powder remaining on the xerographic plate after transfer by means of rotating brushes, and a light source 28 adapted to flood the xerographic plate with light to cause dissipation of any residual electrical charge remaining on the xerographic plate.

Suitable drive means described hereinafter drive the drum, development electrode, powder cloud generator, web feed mechanism and the plate cleaning device.

Referring now to the figures for detailed structural features of the device, there is provided a frame for supporting the components of the apparatus formed by base plate 31 and side plates 32 and 33. These plates are connected together by suitable means and the side plates are rigidly maintained in spaced relation to each other by suitable tie plates, such as plate 34.

The xerographic drum 10 is mounted on horizontal driven drum shaft 36 journaled in the side plates and the housing of a gear unit 47 described hereinafter, with the drum positioned between the side plates and the major xerographic components of the machine mounted around the drum.

For driving the drum at a variable speed there is secured to plate 34 a motor MOT–2 connected by shaft coupling 41 to the input shaft of a conventional variable speed drive 37 the output speed of which can be controlled by control shaft 38 which may be either manually or automatically manipulated to vary the speed of the drum in relation to changes, for example, in the ground speed of the aircraft.

The output shaft of the variable speed drive 37 is connected by a second shaft coupling 41 to the horizontal or drive shaft 43 of a conventional right angle gear unit 42 secured to side plate 32. Drive shaft 43 has worm 44 thereon to drive the worm gear 45 on one end of shaft 46, which as shown, is the driven shaft of gear unit 42 and the drive shaft of a second right angle gear unit 47 also secured to the side plate 32. Worm 48 on shaft 46 drives worm gear 51 secured to the driven shaft or drum shaft 36 of this gear unit. A shield 35 is secured to the side plates 32 and 33 in position beneath the motor MOT–2 and its associated elements to protect the drum from oil and dirt.

Shaft 46 also effects operation of the powder cloud generator 17, the shaft 46 being connected by a magnetic clutch 52, designated in the electrical circuit as solenoid SOL–4, to shaft 53 having bevel gear 54 thereon which engages another bevel gear 54 on shaft 53a to drive gear 55. Gear 55 drives gear 56 attached to one end of shaft 57, the other end of the shaft being coupled by gears 58 and 59 to the drive shaft of the powder cloud generator 17.

*Charging Apparatus*

In general, the electrostatic charging of the xerographic plate in preparation for the exposure step is accomplished by means of a corona generating device whereby an electrostatic charge is applied to the plate surface as it moves relative to the charging device.

Although any one of a number of types of corona generating devices may be used to charge a xerographic plate, a scorotron and its control circuit of the type disclosed in copending application Serial No. 19,846, filed concurrently herewith in the name of Joseph J. Codichini on April 4, 1960, and now U.S. Patent No. 3,062,965, is used to uniformly charge the xerographic plate at various plate speeds.

Specifically, the corona generating device 11 consists of two terminal blocks 61 and 62 made of suitable insulating material connected to opposite ends of grid bar 63 by means of screws (not shown). Stretched between and attached by means of studs 66 to the stopped portions of the terminal blocks are a plurality of fine high voltage coronode wires or wires 65 of continuous length. One end of the continuous length wire is secured by a screw 64 to terminal block 62, the wire then extending between the terminal blocks parallel to grid bar 63 to form three strands of wires, the opposite end of the wire ending at terminal block 61 where the wire extends through apertures 67 and 68 therein and is connected to binding post 71 threaded into the bottom end of terminal block 61.

To control or suppress the effective charging potential of wires 65 there is provided a pair of walls 72 secured by means of screws 64 to the terminal blocks, each of the walls 72 having converging portions 73 each arranged at an angle of approximately 45° to its wall and a top portion partly extending over the top of the terminal blocks. The top portions of the walls 72 are spaced apart to afford a corona discharge opening 74 extending parallel and above the wires 65.

The corona discharge opening 74 is partly screened by grid wires 75 of continuous length electrically connected to side walls 72, the grid wires extending between the terminal blocks to which they are secured by means of studs 66 in the top of these blocks. One end of wire forming screen or grid wires 75 is connected by a screw 64 to the end of terminal block 61 and then the wire is wound on the studs of the terminal blocks to form as shown eight strands of wires of continuous length, the opposite end of the wire extending through a second aperture 68 in terminal block 61 to be connected to a second binding post 76.

Both the wires 65 and 75 are made of any suitable noncorrosive material such as stainless steel having a uniform exterior. In the embodiment of the charging device shown the diameter of wires 65 is approximately three and one-half thousandths of an inch and the diameter of wires 75 is approximately ten thousandths of an inch.

Figure 6:
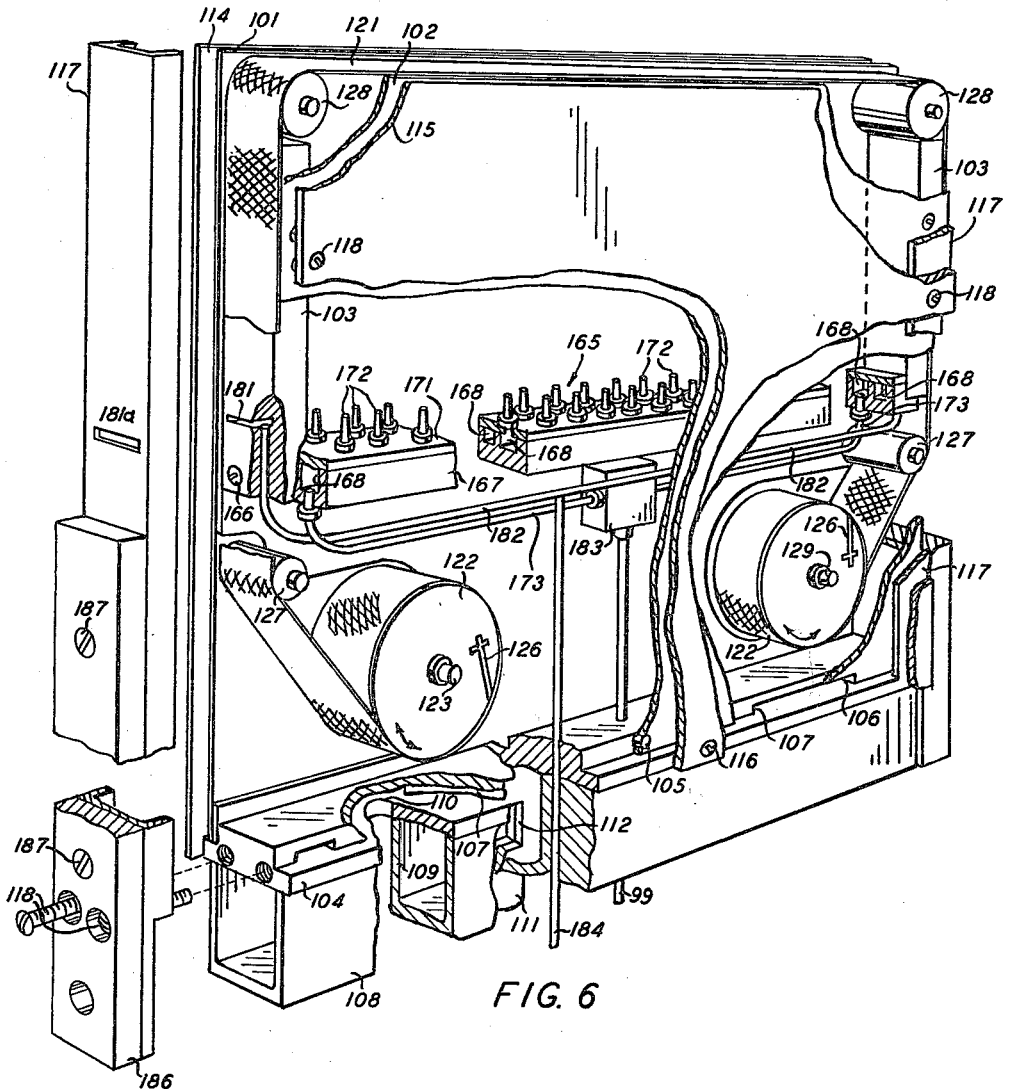
FIG. 6 is a front perspective view, partly broken away, of the development electrode of the apparatus.
Figure 7:
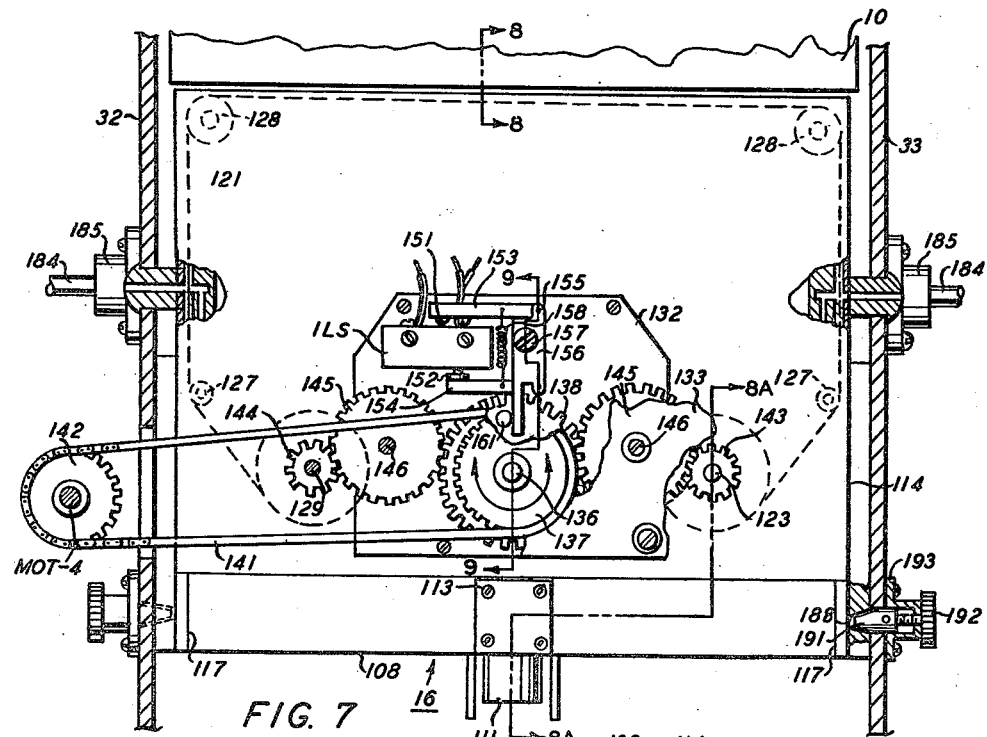
FIG. 7 is a partial rear elevation view of the apparatus showing the development electrode assembly.

For supporting the charging device there is provided a slide grid 77 having attached on its bottom side, as seen in FIG. 6, at opposite ends thereof a pair of flanged mounting plates 78 by means of which the charging device is suitably attached to a frame element of the xerographic apparatus, and having attached to its upper surface a pair of grid slide bars 81, extending the length of the slide grid and on opposite sides thereof, by means of screws 82 and nuts 83.

To prevent longitudinal movement of the charging device a support plate 68 adapted for connection in a suitable manner to a frame element of the machine is secured to the outer face of terminal block 61.

Figures 15, 15A:
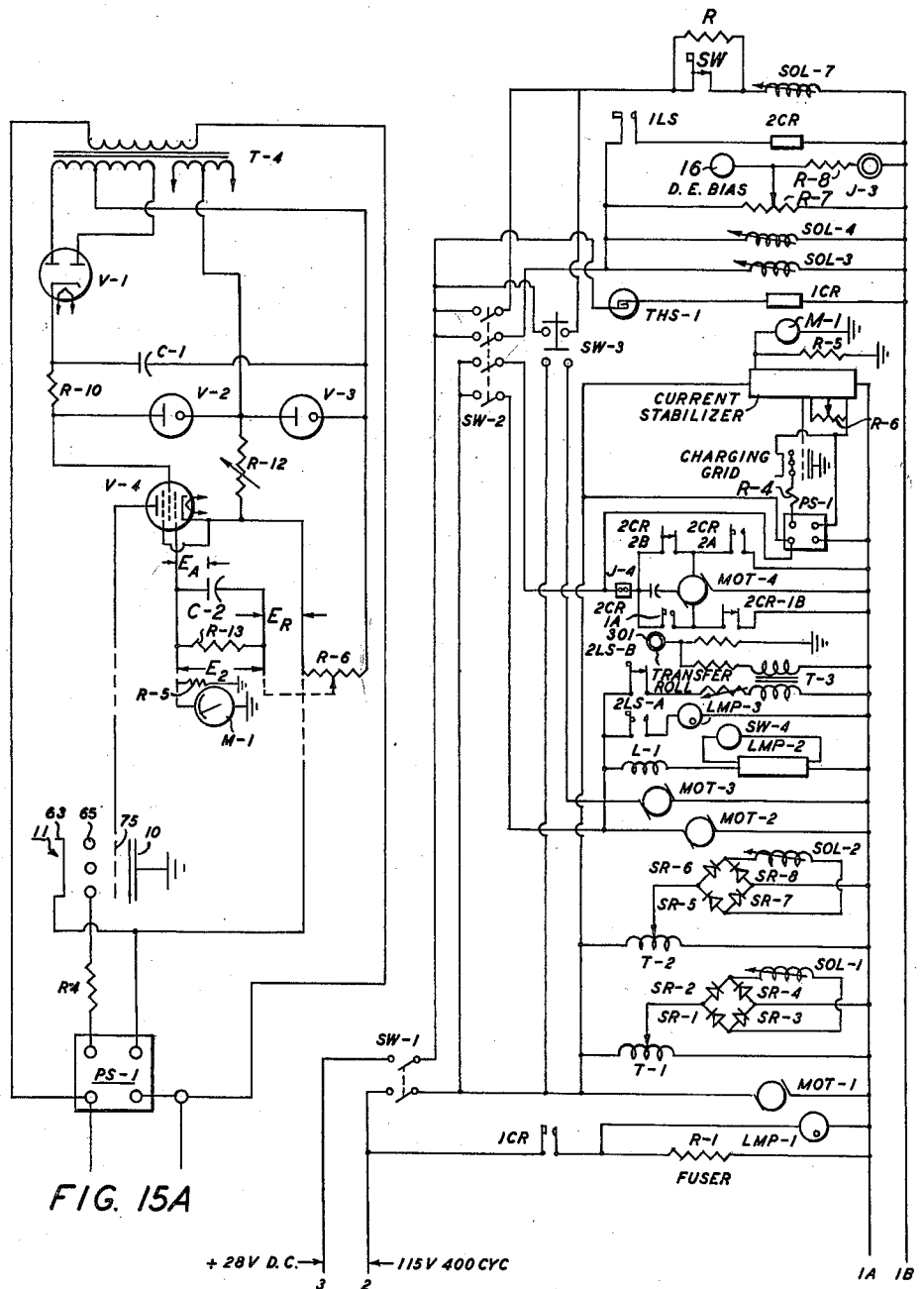
FIG. 15 is a schematic electrical wiring diagram of the xerographic apparatus.
FIG. 15a is an enlarged schematic electrical wiring diagram of a portion of FIG. 15 showing the current stabilizer of the circuit.

A clearer understanding of the operation of the charging apparatus and of its electrical controlling circuit can best be obtained by reference to the schematic wiring diagram of FIG. 15A. The corona generating device 11 is shown in this figure as being positioned above a xerographic plate 10 suitably grounded. Coronode wires 65 are connected to a power source PS-1 in the potential range of approximately 6000 to 11,000 volts. As the coronode wires 65 are energized by this high potential power source, corona emission or ion flow from the coronodes occurs causing a charging current to flow from the coronodes to the xerographic plate. Corona emission for a given size wire is affected by changes in the applied potential, by deposits of dust that may accumulate on the wire and by variations of movement and ionized conditions of the air sheath surrounding the coronode. The latter condition becomes acute when the apparatus is used in an aircraft which normally operates at varying altitudes since as the air becomes less dense as the altitude increases the corona emission will increase.

It has been found as disclosed in Walkup Patent 2,777,957 that by the introduction of an electrode, such as a conductive shield or grid between the source of corona emission or ions and the zerographic plate to which the ions are flowing that the flow of ions or charging current can be suppressed. By using a conductive shield or grid acting as a control electrode, a portion of the ions released by the coronode wires is imparted through the control electrode to the xerographic plate, the remaining ions released being suppressed and drained off by the control electrode.

The magnitude of the charging current then becomes a function of both the rate of corona emission from the coronodes and the potential applied to the control electrode.

In the circuit a conventional high voltage power supply PS-1 is connected to a source of alternating current. The potential of this power supply depends to a certain extent on the diameter of the coronode wires, and with wires of conventional size, for suitable durability, it is preferred to have this power supply capable of generating a potential of between 6,000 to 8,000 volts. The binding post 71 to which the coronode wires 65 are attached, is connected by a suitable conductor in series with resistor R-4 to the positive output terminal of the high voltage power supply and the grid bar 63 is connected to the negative terminal of the high voltage power supply.

The primary of a multiple step transformer T-4 is also connected to the source of alternating current. Opposite ends of the high voltage secondary winding of transformer T-4 are connected to the anodes of a full wave rectifier V-1. Rectifier V-1 in parallel with capacitor C-1 forms a rectifying circuit, so that direct current is supplied to the voltage regulator tube V-3 and to voltage regulator tube V-2 in series with resistor R-10. Tube V-3 is a voltage reference tube which supplies a reference voltage $E_R$ in series with a cathode of control tube V-4, for example, a high gain pentode. The output of the control tube V-4 is applied to the screen 75, the conductor line from the control tube being connected to terminal post 76 of the scorotron 11.

The charging current is set to the value, as indicated on meter M-1 connected in parallel to resistor R-5, depending upon the particular print contrast desired by adjustment of potentiometer R-12 which is connected in series with rheostat R-6, this setting being made at a predetermined drum speed.

In operation any change of current through resistor R-13 (charging current from coronodes to the xerographic plate) which is in parallel with capacitor C-2, produces a change in the applied voltage to the grid of control tube V-4. The result is a change in tube resistance which produces a change in screen potential.

The voltage drop across R-13 is proportional to the charging current and is compared to the reference voltage $E_R$. As shown, the difference voltage ($E_2 - E_R$) is used as the input signal to the control tube. This difference voltage is designated as Ea in the figure.

With this circuit, as a decrease in charging current occurs, the resistance of control tube V-4 decreases thereby increasing the screen voltage to permit the charging current to increase back to its desired value and of course the converse is true as the charging current increases above a desired value.

Figure 3:
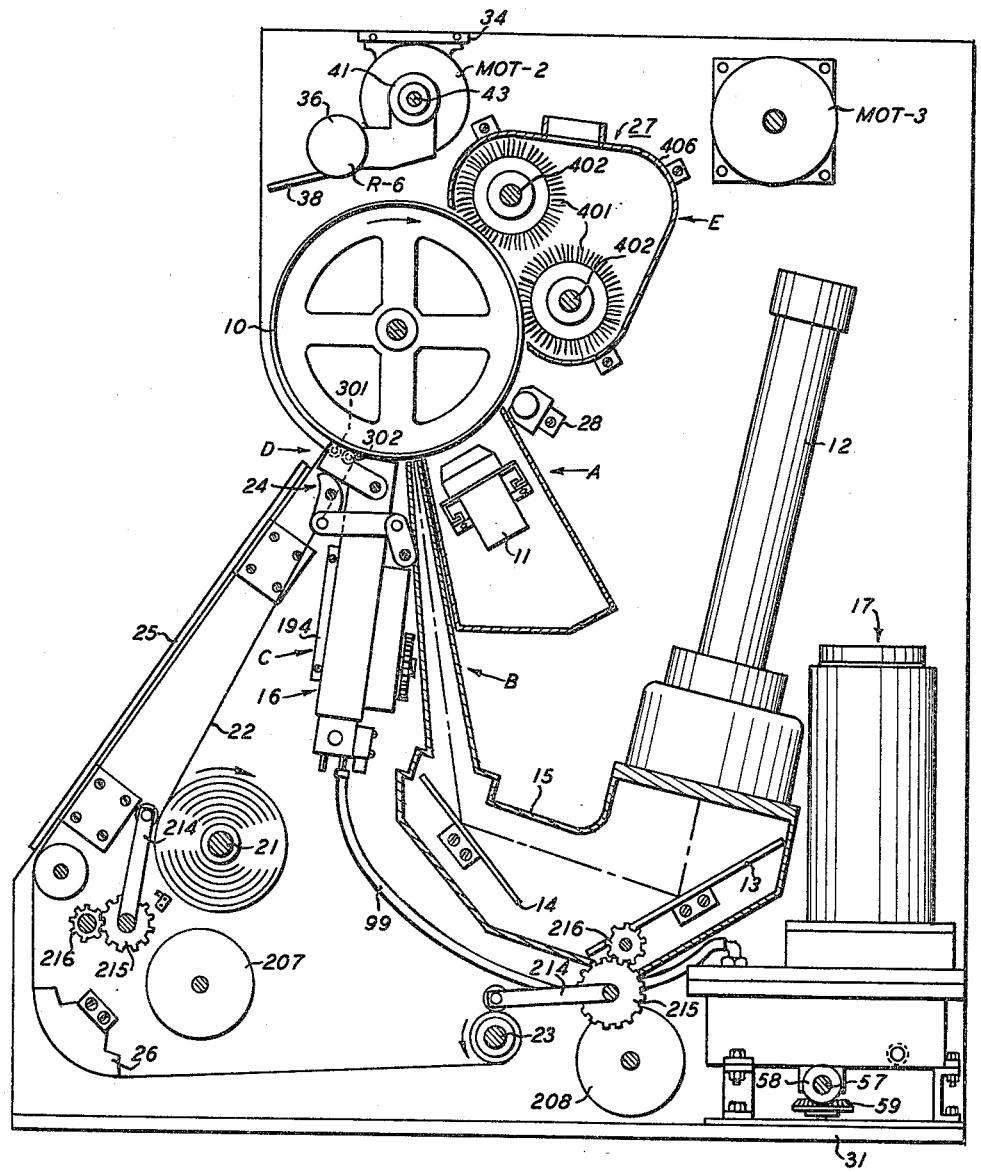
FIG. 3 is a sectional right-hand view of the apparatus taken just inside the right-hand frame plate.

As previously described the charging current is set to a desired value for a given drum speed. However, with a fixed setting, as the drum speed increases the current would decrease and of course as the drum speed decreased the current would increase. With a linear relationship existing in this circuit between reference voltage $E_r$ and the charging current, by using a linear potentiometer R-6 control can be established such that charging current is proportional to the angular rotation of the potentiometer. Therefore, to control the charging current at a desired value at various drum speed, potentiometer R-6 as shown in FIG. 3 is mounted adjacent to the variable speed drive 37 for operation by control shaft 38 to which it is mechanically linked in a suitable manner. Thus as control shaft 38 is actuated to effect operation of the variable speed drive to change drum speed, the potentiometer R-6 will be adjusted to maintain the desired drum speed.

*Development System*

Although any suitable developing apparatus may be used to effect development of the electrostatic latent image on the xerographic plate, it has been found that powder cloud development as described in Carlson 2,221,776, is preferred for continuous tone images.

In the system shown there is provided a moving screen development electrode of the type disclosed in copending application Serial No. 19,952, filed concurrently herewith in the names of John T. Bickmore, Harold Bogdonoff and William J. Burris on April 4, 1960, which coacts with the xerographic plate to form a development zone wherein the charged and exposed surface of the drum is developed by a development material, usually referred to as toner, to form a powder image of the copy.

Referring now to the drawings and in particular to FIG. 14 which is an illustration of a block diagram of the elements of the developing system. As indicated in this diagram, compressed aeriform fluid is fed from compressor 96, usually an auxiliary element and not an integral element of the machine, to a power cloud generator 17 of the type disclosed in copending application Serial No. 19,845 filed concurrently herewith in the name of Charles L. Huber on April 4, 1960, through a regulating valve or reducer valve 97 and two-way valve 98, the output of the powder cloud generator being fed through conduit 99 to the development electrode 16 for discharge into the development zone formed by the development electrode and the xerographic plate.

Specifically as shown in FIGS. 5 to 9, inclusive, the development electrode 16 consists of inner side plates 101 and 102 secured to and held in spaced-apart parallel relation to each other by means of partial end plates 103 and base plate 104. Inner side plates 101 and 102 are secured and positioned by dowels 105 on the stepped portions of the base plate with their lower cutout portions 106 in alignment with the apertures 107 in the base plate.

A substantially U-shaped channel 108 is secured to base plate 104 as by welding the legs of the channel to the underside of the base plate to form an elongated duct 109 connected by bored holes 110 in the base plate to the apertures 107, previously described, in the base plate. In the center of the channel a discharge elbow 111 is secured to a leg of the channel 108 in alignment with the discharge opening 112 formed in the leg of the channel by screws 113 extending through the discharge elbow and threaded into the channel.

Outer side plates 114 and 115 are secured at their lower ends by screws 116 to the sides of the base plate 104 and are held in spaced parallel relation to the inner side plates 101 and 102, respectively, by end channels 117, the legs of which serve as spacers between the respective inner and outer side plates. As shown, these elements are held together by means of screws 118 which extend through an outer side plate, a leg of a channel 117 and an inner side plate and which are threaded into a partial end plate. The lower plain ends of the channels 117 act as closure plates over the ends of channel 108 and base plate 104 to form with these elements the enclosed chamber or elongated duct 109.

Although any suitable screen may be used for the actual electrode, in the preferred embodiment, a web of 40 mesh screen 121 is used in the apparatus. Since toner particles will adhere to the screen during the developing process it is desirable to permit portions of the screen to be moved from an operating position relative to the xerographic plate to a non-operating position in which the screen may be cleaned. This may be accomplished by means of an endless screen web moving continually through an operating position and a non-operating position, or as shown in the preferred embodiment, a screen web of finite length is used as the screen electrode.

To support the screen and to permit the screen to be moved there is provided a first reel 122 mounted on shaft 123 journaled between the inner side plates by bearings 124 and 125 to which one end of screen 121 is secured in a suitable manner in a screen slot 126 provided on the reel. From the reel 122 the screen web passes around idler roller 127 up the edge of the inner side plates and the face of the left-hand end plate 103 over and around idler roller 128 from where it is guided by slots 131 in the inner side plates across these plates over a second idler roller 128 down over a second idler roller 127 and then it is wound a number of turns onto a second reel 122 with the end of the web secured in the screen slot 126 in this reel.

Figure 8:
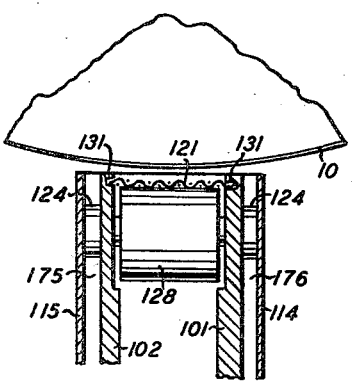
FIG. 8 is an enlarged sectional view taken along line 8—8 of FIG. 7.

The second reel 122 is mounted on shaft 129 mounted, in a similar manner to shaft 123, in the side plates, and each of the idler rollers 127 and 128 are journaled by means of bearings 124. As shown in FIG. 8 the inner side plates are undercut to provide adequate clearance between these plates and the above-described rollers.

Each of the shafts 123 and 129, carrying the reels 122, have secured at their outer ends gears 143 and 144, respectively, by means of which the reels are rotated either clockwise or counterclockwise, as described hereinafter for moving the screen 121. Gears 143 and 144 are both driven either clockwise or counterclockwise by gear 138 on shaft 136 through idler gears 145 mounted on shafts 146. Shafts 136 and 146 are suitably journaled at one end in mounting plate 132 secured to the outer side plate 114 and at their other end in guard plate 133 held in spaced parallel relation to the mounting plate by spacers 134 and screws 135.

Shaft 136, which extends outboard of guard plate 133, is operatively connected to motor MOT-4 secured to the side plate 32 of the xerographic apparatus by chain 141, which runs on sprockets 137 and 142 fixedly mounted on shaft 136 and the shaft of motor MOT-4, respectively.

The motor MOT-4 is connected to a source of electric power, as shown in FIG. 15, and is controlled by switching means whereby the motor is rotated either clockwise or counterclockwise by reversing the polarity of the incoming power. As shown in FIG. 15, which illustrates diagrammatically the electrical circuit of the machine, a mechanically actuated double pole double throw control relay 2CR is used to actuate motor MOT-4 either clockwise or counterclockwise. The relay control switch 1LS is attached to mounting plate 132 to be actuated by plungers 151 and 152 operated by actuator arms 153 and 154, respectively, attached by pins 155 to lever 156 pivotally secured to mounting plate 132 by shoulder bolt 157. Actuator arms 153 and 154 although pivotally connected to lever 156 are biased against the shoulders on the lever by means of spring 158 attached at opposite ends to the actuator arms through suitable openings therein. To effect operation of the lever there is provided a cam pin 161 secured to drive gear 138 in interference relationship with the lever 156 as drive gear 138 is rotated, it being apparent that this gear will be rotated only one revolution approximately before the cam pin 161 will contact lever 156 to trip the control switch to actuate the relay and to effect reversal of the motor MOT-4.

To supply developing material to the development zone between the xerographic plate and the moving screen development electrode there is provided a discharge manifold, generally designated 165 mounted between the inner side plates and connected to the partial end plates 103 by screws 166, the partial end plates serving as closure plates for the ends of the manifold. The manifold in the preferred embodiment consists of manifold block 167 having two parallel grooves 168 therein extending substantially the full length of the manifold block. Secured to the top of the manifold block is a cover plate 171 having two parallel rows of discharge nozzles 172 positioned vertically thereon with each row of discharge nozzles being in communication with a groove in the manifold block.

The discharge nozzles are arranged to deliver a uniform flow of developer material in the form of a powder cloud through the openings in the screen 121 into the development zone. To permit maximum uniformity of flow, the powder cloud is delivered to the front groove 168 from the left side and to the rear groove from the right side as seen in FIG. 6, by means of conduits 173 connected to a multiple outlet block 183 which is connected by conduit 99, extending through base plate 104 and channel 108, to the powder cloud generator 17. By flowing the powder cloud in opposite directions through the grooves, the effect of a pressure drop from one end to the opposite end of one groove is canceled out because the reverse pattern of flow will occur in the second groove.

With the xerographic plate moving past the development electrode and therefore past the screen 121, a uniform amount of developer powder is evenly distributed through the interstices of the screen over the entire surface of the xerographic plate immediately adjacent to the development electrode, the flow of the developer powder being substantially at right angles to the plate surface in its passage through the screen. As the developer powder particles are carried into the development zone, they selectively deposit on the surface of the xerographic plate in accordance with and in conformity with the electrostatic latent image on the xerographic plate to yield a developed xerographic print.

As described in Hayford Patent 2,808,023, it is desirable to provide an electrical potential difference between the conductive backing of the xerographic plate and the development electrode. As shown in FIG. 15 a direct current potential is applied to the development electrode through potentiometer R-7 while the conductive backing of the xerographic plate is grounded.

As previously mentioned, no powder cloud should contact a plate bearing an electrostatic latent image where there is no electrode because image edges are preferentially developed under these conditions. Developing powder which would therefore develop a charged and exposed xerographic plate without an electrode present would be damaging to the sensitometric quality of the resultant powder image. Therefore, escaping powder must be disposed of before it can deposit on a charged and exposed surface of the plate outside of margin of influence of the development electrode. This powder if not caught causes peculiar non-electrode effects.

Figures 8A, 9:
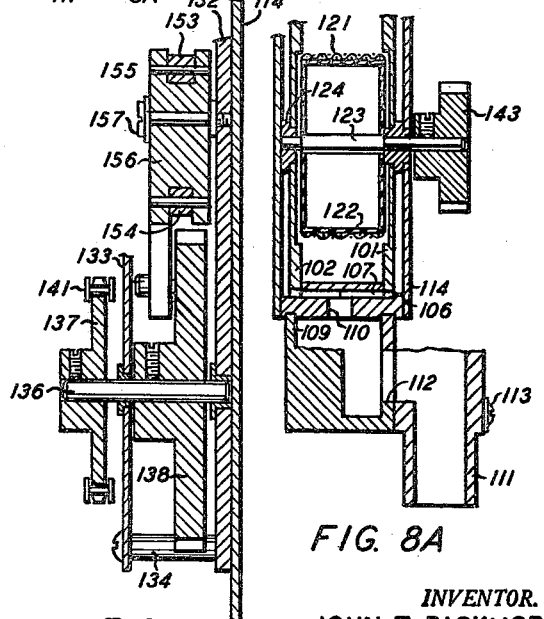
FIG. 8a is an enlarged sectional view taken along line 8a—8a of FIG. 7.
FIG. 9 is an enlarged sectional view taken along line 9—9 of FIG. 7.
Figure 10:
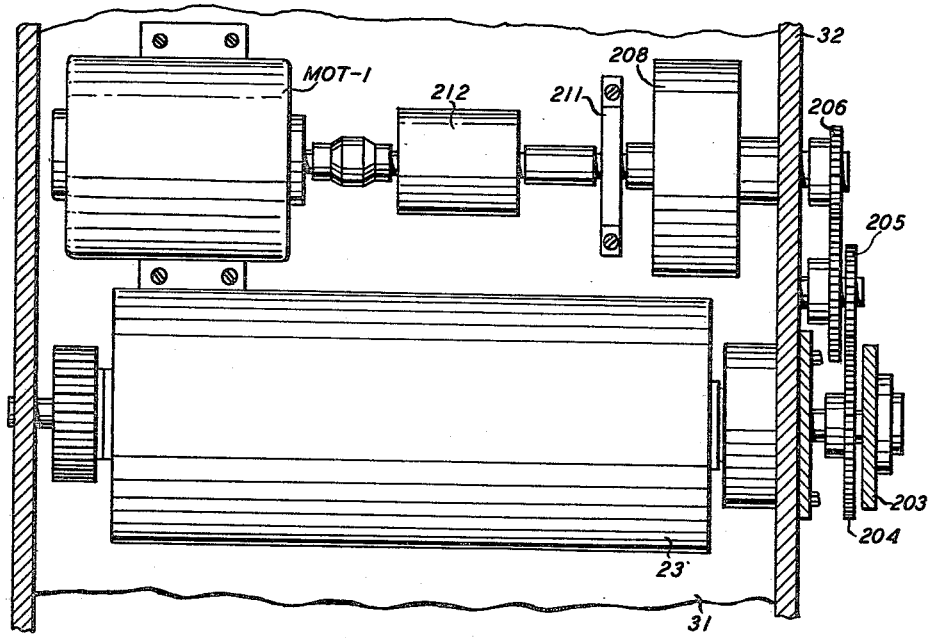
FIG. 10 is a top view of the paper take-up mechanism of the apparatus.
Figure 11:
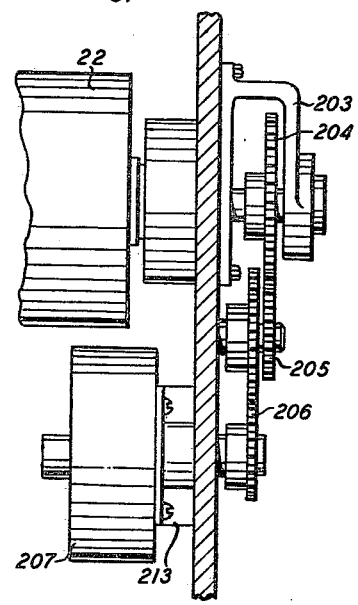
FIG. 11 is a sectional view in part of the paper supply mechanism of the apparatus taken along line 11—11 of FIG. 2.

As shown in FIGS. 6, 8, and 8a, the inner side plates 101 and 102 are spaced apart from the outer side plates 114 and 115, respectively, to form inlet ducts 175 and 176, respectively, through which excess developing powder can be removed from opposite longitudinal sides of the screen 121. These ducts communicate via the cutout portions 106 in the inner side plates 101 and 102, apertures 107 and the bored holes 110 in base plate 104, duct 109 and discharge opening 112 in channel 108 with the discharge elbow 111. Discharge elbow 111 is suitably connected to a conventional dust collector 178 having a blower therein as shown in FIG. 14, the latter element preferably being an auxiliary piece of equipment rather than an integral component of the xerographic machine.

During development of the electrostatic latent image on the surface of the xerographic plate, the developing powder particles are brought into the development zone between the plate and the development electrode. The screen 121, which is spaced at a slight distance from the plate, tends to build-up on its surface a coating of developing powder. As long as this powder accumulation remains light, the image which is developed is ordinarily not affected adversely. However, a relatively heavy coating of developing powder on the screen interposes a new surface between the xerographic plate and the development electrode which may substantially diminish the beneficial aspects of the development electrode during the developing process. As powder particles build-up on the screen the effective size of the openings in the screen will be reduced resulting in decreased flow of developing power into the developing zone.

Although a number of methods may be used to clean the screen 121, in the embodiment disclosed, there is provided a clean air duct 181 in each of the partial end plates 103 over which the screen passes. Each of these clean air ducts is connected by conduits 182 which are supplied with pressurized aeriform fluid through conduit 184 from air compressor 96 as seen in FIG. 14.

As the screen traverses an air duct 181, compressed aeriform fluid is discharged through the openings in the screen carrying developing powder with it. To deliver this fluid containing developing powder to a disposal point such as dust collector 178, each air duct 181 is connected through an aperture 181a formed in a channel 117 to an apertured dust block 185 and then through a conduit 184 to the dust collector 178. As shown, the dust blocks 185 are connected to opposite sides of the development electrode assembly and are secured to frame plates 32 and 33.

To support the development electrode assembly there is positioned on the back of each end channel 117 an electrode mounting plate 186 secured to the channel and electrode assembly by means of screws 187. Each of the electrode mounting plates is provided at its lower end with a tapered aperture 188 adapted to receive the taper portion of a taper pin 191 adjustably positioned by control knob 192 having a threaded portion adjustably received by a threaded boss 193 fastened to a side plate. The taper pin is suitably pinned to the threaded portion of the control knob for movement therewith. To insure proper alignment of the development electrode with respect to the drum 10, guide plates 194 are secured on the inner faces of frame plates 32 and 33, as seen in FIG. 1.

*Sheet Feeding Mechanism*

Since a xerographic plate, unlike photographic film, is reusable, it is desirable to transfer the developed xerographic powder image from the xerographic plate to a suitable support material to form a permanent reproduction of the image copied. The support material may be any suitable material, usually paper, either in web or cut-sheet form. In the embodiment shown the support material is in web form for reasons described hereinafter.

As shown, a supply of support material, hereinafter referred to as a paper web 22, is supported by a supply roll 21 from which it is fed upwardly to and over a transfer mechanism 24 into transfer contact with the xerographic plate, then down and around an idler roller 202, around heat fuser 26, having a resistance heating element R-1 therein, to the take-up roll 23. A web of support material is used in the subject machine so that an operator stationed at the front of the apparatus may view the transferred images on the paper web before the copy is fused thereon as it is fed from the transfer mechanism under the viewing platen 25 across the idler roller to the heat fuser. Referring now to FIG. 3, it can be seen that by using a development electrode of the type described and a transfer mechanism of the type described hereinafter, the operator can view the developed and transferred images on the paper web within a matter of seconds after the xerographic plate has been exposed.

The supply roll 21 and take-up roll 23, both of conventional design are journaled in frame plates 32, 33 and in bearing brackets 203 secured to frame plate 32, each roll being provided with a gear 204 outboard of frame plate 32.

Gear 204 no the supply roll is part of a gear train consisting of compound gear 205 and gear 206 connected to a hysteresis brake 207. Gear 204 on the take-up roll is part of a similar gear train consisting of compound gear 205 and gear 206 connected to the output shaft of hysteresis clutch 208. The output shaft of hysteresis clutch 208 is journaled in frame plate 32 and the input shaft of this clutch is journaled in pillow block 211, and connected to speed reducer 212 driven by paper take-up motor MOT-1. The hysteresis brake 207 is secured to frame plate 32 by brackets 213.

As shown in FIG. 15 the paper take-up motor MOT-1, the field of the hysteresis clutch 208 and the field of the hysteresis brake 207 are suitably connected to a source of power. The hysteresis clutch 208 and the hysteresis brake 207 are represented schematically in the electrical circuit as solenoids SOL-1 and SOL-2, respectively. These units are used to apply the proper tension to the paper web, the web being driven by the drum and a roll of transfer device which grip the paper web with sufficient tension to draw it from the supply roll. In order to tension the paper web there must be a resisting force as well as a pulling force. The resisting force in the paper feed system is applied through brake 207.

To compensate for the changes in the pulling force on the web as the paper web is transferred from the supply roll to the take-up roll, each roll is provided with a dancer roll 214 riding on the paper web to sense the diameter of the web of support material on the rolls. Each dancer roll is connected through gear 215 and 216 to the rotatable element of a variac designated T-1 for use in controlling the voltage to the clutch 208 and T-2 for use in controlling the voltage to brake 207.

Using the clutch 208, as an example, when the dancer roll is resting on the core of take-up roll 23, minimum voltage should be applied to the clutch and when it is resting on a completed roll maximum voltage should be applied to the clutch.

*Transfer Mechanism*

The transfer of the xerographic powder image from the plate surface to the support material is effected by means of transfer mechanism 24 that is located immediately after the development electrode 16 in the direction of movement of the plate. Although any suitable transfer mechanism may be used, the transfer mechanism used is of the type disclosed in copending application Serial No. 19,913, filed concurrently herewith in the names of Charles L. Huber and Harvey H. Hunter on April 4, 1960.

The transfer mechanism 24 includes a transfer roller 301 around which the paper web is transported into contact with the xerographic plate. Transfer roller 301 is desirably made of conductive rubber on a conductive metal core. The outer shell of the transfer roller is made of conductive rubber or other resilient material so as to compensate for any surface irregularities in the plate surface or paper web, and to prevent damage to the plate surface as it forces the paper web into contact therewith. During the transfer process an alternating current potential of at least 1,000 volts is applied to the transfer roller to effect electrostatic transfer of the xerographic powder image from the plate surface to the paper web.

Figure 4:
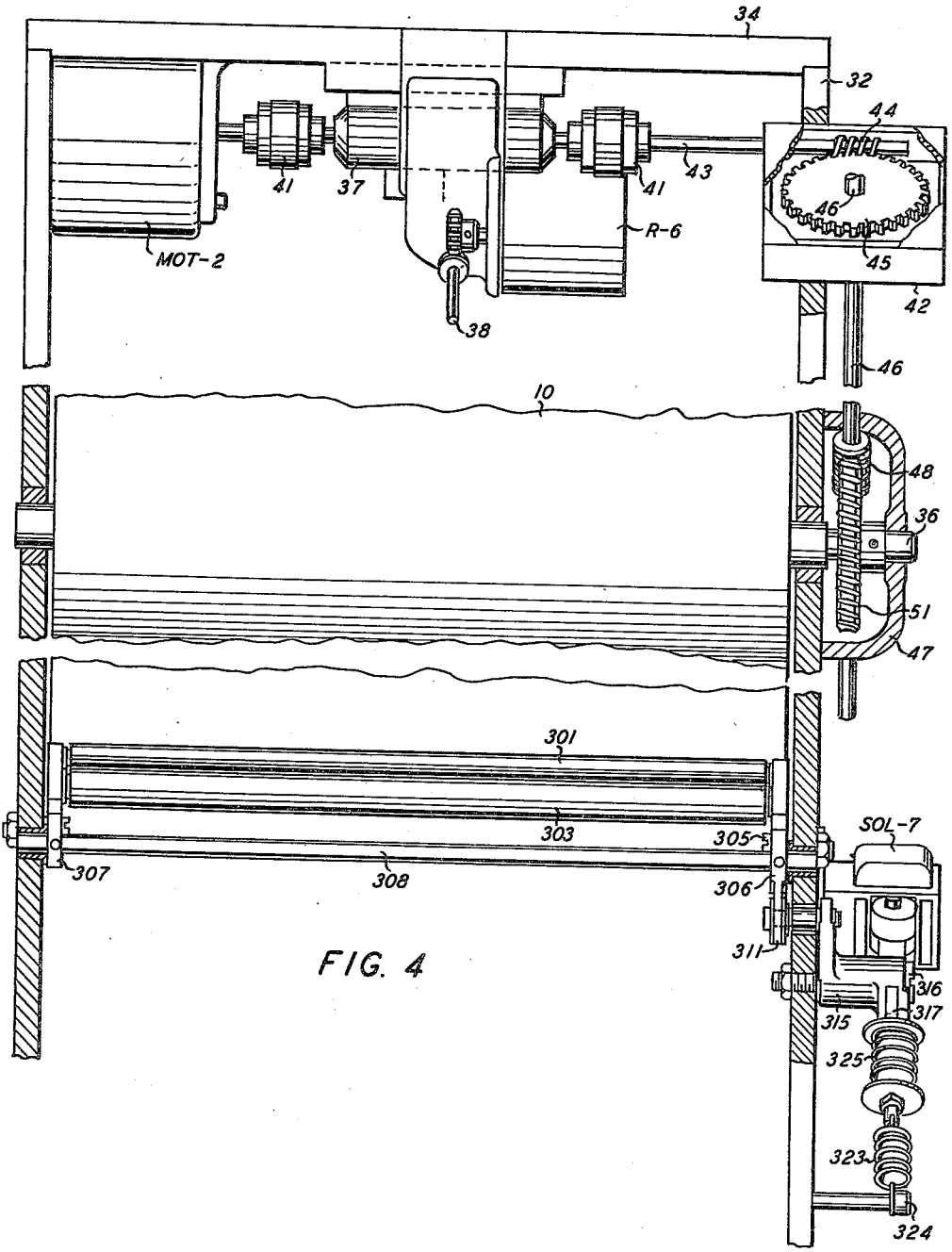
FIG. 4 is a front view of the motor drive assembly, drum drive assembly and transfer mechanism, partially in section and with parts removed, of the apparatus taken along lines 4—4 of FIG. 2.
Figure 5:
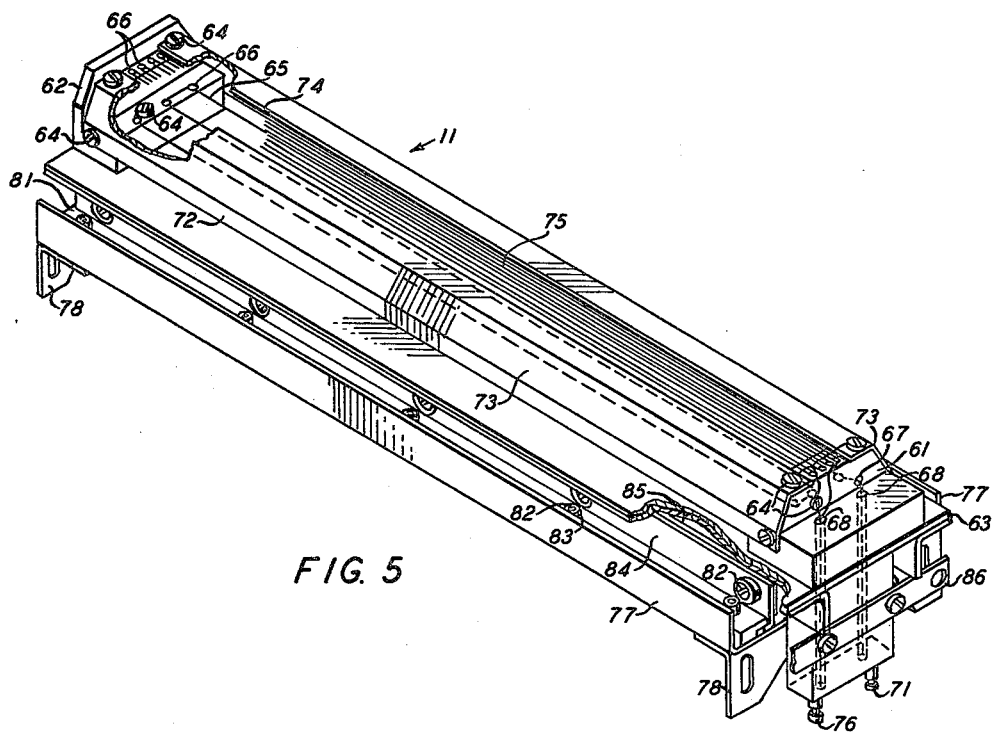
FIG. 5 is a perspective view, partly broken away to show structural details, of the charging mechanism used in the apparatus.

As shown, especially in FIGS. 4, 12 and 13, the transfer roller 301, which is of a length at least equal to the width of the image producing area of the xerographic plate, is journaled at opposite ends in lever arms 304 pivotally secured by shoulder bolts 305 to the inner faces of frame plates 32 and 33.

Because of the charge placed on the transfer roller, powder images on the plate in the immediate vicinity of the transfer roller tend to jump off of the plate at random. If this occurs while the paper web is near the drum but not yet in contact therewith, a powder image will be partly transferred to the paper web before it is in contact with the drum 10 and the remainder of the powder image will be transferred to the paper web as it passes between the transfer roller and the plate in contact therewith.

Because of the curvature of the plate and because the charge radiates from the transfer roller in various directions this pre-transfer of a powder image results in a second image on the support material which is out of registration with the final powder image transferred onto the paper web. To prevent this from occurring there is provided a guide 302, herein shown as a roller journaled in the lever arms, positioned in advance of the transfer roller to force the paper web into intimate contact with the drum surface as it rotates toward the transfer roller 301.

Since in the embodiment disclosed it is desirable to view the xerographic powder images as soon as possible after they are developed, both the transfer roller and guide 302 are made relatively small in diameter and as such, these elements are mechanically weak and need to be supported from flexing away from the plate by a back-up roll 303 journaled in the lever arms 304.

Cams 306 and 307, secured to a cam spindle 308 journaled in the frame plates 32 and 33 and extending therebetween, are positioned to contact the lever arms 304 to move the transfer roller from a first position in which it is in operative relation to the plate to be driven by frictional engagement with the plate or with a paper web interposed therebetween. The lower end of cam 306 is pivotally positioned in the bifurcated end of a lever 311 by pin 312. The opposite end of lever 311 is pivotally secured to one end of a stud pin 313 which extends through an elongated slot 314 in frame plate 32 and has its opposite end journaled in and secured to one end of crank arm 315 pivotally secured by means of shoulder bolt 316 to frame plate 32.

For actuating this lever system there is provided an actuator arm 317 secured by pin 318 to the bifurcated end of the solenoid plunger of normally open solenoid SOL-7 attached to frame plate 32. The opposite end or bifurcated end of crank arm 315 is pivotally secured to the actuator arm 317 by means of actuator pin 321 extending through a slot 322 in the actuator arm and a suitable aperture in the crank arm. Spring 323 secured at one end to bolt 324 in frame plate 32 and at its opposite end to actuator arm 317 will bias the solenoid plunger to its extended position when the circuit to solenoid SOL-7 is open to thereby actuate the lever system to permit the transfer roller to fall by gravity or by the tension of the paper web away from the xerographic plate when the machine is not in operation and to permit threading of the paper web around the transfer roller and guide.

To permit adjustment of the contact pressure of the transfer roller with the xerographic plate to say, for example, a pressure of approximately five pounds per inch of roller length, and to prevent sudden impact damage to the xerographic plate when the transfer roller is pressed into contact thereon, there is provided a spring 325 encircling the actuator arm with one end of the spring abutting spring washer 326 slidably positioned and biased against the crank arm and the other end of the spring butting against washer 327 adjustably positioned by nuts 328 on the threaded end of the actuator arm.

*Plate Cleaning Assembly*

The plate cleaning assembly includes a plate cleaner 27 and a light source 28. The plate cleaner 27 comprises a pair of rotatable brushes 401, such as fur brushes, of such construction as to apply extremely light pressure to the photoconductive surface of the xerographic plate to dislodge any powder particles that may be adhering to it after transfer. The brushes are supported and rotated by shafts 402 journaled in casing 406. The shafts 402 extend through frame plate 32 and are driven by pulleys 403 connected by belts 404 to the compound pulley 405 on motor MOT-3 adjustably attached to frame plate 32.

For containing powder particles removed from the xerographic plate by these brushes, the casing 406 is formed to encompass the brushes except where they contact the xerographic plate and it is provided with suitable flanges for securing it to the frame plates 32 and 33. An exhaust duct is arranged at the top of the casing to connect it by means of a suitable conduit to the dust collector 178 whereby the dust particles removed by the brushes are drawn from the casing.

The light source 28 attached to the frame plates 32 and 33 has a conventional fluorescent lamp LMP-2 mounted therein which is used to flood a portion of the xerographic plate as it passes thereby to dissipate the residual charge remaining on the plate.

Circuit

A clearer understanding of the operation of the xerographic apparatus and of the electrical circuit controlling the various elements can best be obtained by reference to the schematic wiring diagram of FIG. 15.

Before starting the machine, a supply of support material 22 is placed on the supply roll 21 and then threaded up and around the rollers 301 and 302 of the transfer mechanism 24, down under platen 25, around idler roller 202, then around heat fuser 26 onto take-up roll 23. The powder cloud generator 17 is charged with a supply of developer material before pressurized fluid is delivered to the generator.

Since the compressor 96 and the dust collector 178 and its blower are preferably not an integral part of the machine and since the exposure mechanism would preferably have a separate control circuit operated independently of the control circuit of the xerographic apparatus, their operation is not described herein.

The first operation on starting the machine is for the operator to press the start button or switch SW-1. Switch SW-1 is a single throw two pole switch which connects the appartus to a source of electrical power; in the embodiment disclosed, two power sources are used, a 115 volt 400 cycle alternating current power source and a 28 volt direct current power source.

Upon closure of contact of switch SW-1 in the 115 volt circuit the paper take-up motor MOT-1 is energized and the clutch 208 and brake 207 are placed in operative condition upon the energization of their solenoids SOL-1 and SOL-2, respectively. Power is transmitted to solenoid SOL-1 through the Variac T-1 and the full wave rectifier circuit which includes rectifiers SR-1, SR-2, SR-3 and SR-4 and power is transmitted to solenoid SOL-2 through variac T-2 and the full wave rectifier circuit which includes rectifiers SR-5, SR-6, SR-7 and SR-8. Power is also transmitted to the high voltage power supply PS-1 and to the current stabilizer circuit, previously described, to permit warm-up of these units.

On the 28-volt direct current circuit, as switch SW-1 is closed the thermostat THS-1 is energized to effect actuation of control relay 1CR, to close its normally open contact 1CRA in series with the resistor R-1 of the fuser 26 in the 115-volt circuit. Indicator lamp LMP-1 in parallel with resistor R-1 is energized when power is supplied to the fuser to permit visual indication to the operator that the fuser is in operation.

After the closure of switch SW-1 there is normally a short period of delay before the operator presses the print button or switch SW-2 during which time the heat fuser is permitted to reach the desired temperature for heat fixing the powder images on the support material. Upon closure of switch SW-2 the remaining electrical elements of the apparatus are energized to effect a xerographic reproducing process.

Thus as the high voltage power supply PS-1 and the current stabilizer circuit, previously described, are completely energized for imposing a uniform electrostatic charge on the drum, the drum 10 is rotated by motor MOT-2, and the brushes 401 of plate cleaner 27 are driven by motor MOT-3 and the fluorescent lamp LMP-2 is energized through its conventional starter and ballast circuit.

Since it is not desired to impose a bias potential on the transfer roll 301 of the transfer mechanism when it is in contact with the drum, i.e., without support material interposed between the transfer roll and the drum, the transmission of electrical power to the transfer roll is controlled by a limit switch 2LS (not shown) suitably positioned to be actuated by the dancer roll riding on the support material of the supply roll when the supply of support material thereon is depleted. As shown in FIG. 15, the contact 2LSB of this limit switch is normally closed whereby power is transmitted to the transfer roll through rheostat R-9 and transformer T-3. When the supply of support material on the supply roll is depleted, the limit switch 2LS is actuated by the dancer roll whereby its contact 2LSB is opened to de-energize the transfer roll and its contact 2LSA is closed to energize lamp LMP-3 serving as an indicator lamp to warn the operator that the supply of support material on the supply roll is exhausted.

Motor MOT-4 used to drive the gear train for moving the screen of the development electrode first in one direction and then in an opposite direction is first energized through the normally closed contacts 2CR-1B and 2CR-2B of control relay 2CR. As previously described, the motor will drive the gear 138 in one direction until the cam pin 161 contacts the lever 156 to actuate the relay control switch 1LS which will then energize the control relay 2CR. As control relay 2CR is energized, its contacts 2CR-1B and 2CR-2B will open and its contacts 2CR-1A and 2CR-2A will close to reverse the polarity of the incoming power to the motor thereby reversing the direction of rotation of the motor.

On the 28-volt circuit, as switch SW-2 is closed, the solenoid SOL-3 is energized to open the two-way valve 98 to admit pressurized aeriform fluid to flow to the powder cloud generator 17 which begins to operate as solenoid SOL-4 of clutch 52 is energized to thereby connect shaft 46 to shaft 53. The solenoid SOL-7, for biasing the transfer roll of the transfer system into contact with the drum 10 with support material sandwiched therebetween, is energized through switch SW and resistor R connected in parallel to prevent overheating of the solenoid SOL-7. At the same time a bias potential is applied to the development electrode through the variable resistor R-7.

Normally open switch SW-3 can be actuated by the operator to permit him to run out the web of support material on the supply roll 21 without effecting a xerographic process.

While the invention has been described with reference to the structures disclosed herein, it is not confined to the details set forth, and this application is intended to cover such modifications or changes as may come within the purposes of the improvements or the scope of the following claims.

What is claimed is:

1. A variable speed xerographic processor including in combination a xerographic drum journaled for rotation, charging means positioned adjacent said drum to place an electrostatic charge on said xerographic drum,
    exposure means positioned to project a light image onto said xerographic drum to form an electrostatic latent image thereon,
    an open-mesh electrode positioned adjacent said xerographic drum in closely spaced relation thereto,
    powder cloud generating means operatively connected to said open-mesh electrode to supply a powdered developing material through said open-mesh electrode into the space between said xerographic drum and said open-mesh electrode to develop a previously formed electrostatic latent image on the surface of said xerographic drum, a supply roll and a take-up roll positioned to support a web of support material for movement from said supply roll onto said take-up roll, drive means operatively connected to said take-up roll to effect rotation of said take-up roll, transfer means positioned adjacent said xerographic drum to effect transfer of a developed image from said drum onto the support material, said transfer means including means to bias a portion of the web of support material extending between said supply roll and said take-up roll into driven and transfer engagement with the peripheral surface of said xerographic drum adjacent said transfer means, variable speed drive means connected to said xerographic drum to effect rotation of said xerographic drum, said variable speed drive means including means connected to said powder cloud generating means to vary the speed of operation of said powder cloud generating means, and web tensioning means including a first tensioning means connected to said supply roll and a second tensioning means connected at one end to said drive means and at its other end to said take-up roll, said web tensioning means effecting tension of the web of support material whereby the web of support material is advanced by contact with said xerographic drum adjacent said transfer means.

2. A variable speed xerographic processor according to claim 1 including current stabilizing means connected to said charging means to effect uniform charging of said xerographic drum irrespective of drum speed, line voltage, and ambient pressure conditions.

References Cited in the file of this patent

UNITED STATES PATENTS

| | | |
|---|---|---|
| 2,676,100 | Huebner | Apr. 20, 1954 |
| 2,752,833 | Jacob | July 3, 1956 |
| 2,777,745 | McNaney | Jan. 15, 1957 |
| 2,844,123 | Hayford | July 22, 1958 |